US012717891B2

(12) United States Patent
Nagata

(10) Patent No.: US 12,717,891 B2
(45) Date of Patent: Aug. 25, 2026

(54) INFORMATION COMMUNICATION SYSTEM, INFORMATION COMMUNICATION METHOD, AND RECORDING MEDIUM

(71) Applicant: NEC Corporation, Tokyo (JP)

(72) Inventor: Atsushi Nagata, Tokyo (JP)

(73) Assignee: NEC CORPORATION, Tokyo (JP)

(*) Notice: Subject to any disclaimer, the term of this patent is extended or adjusted under 35 U.S.C. 154(b) by 12 days.

(21) Appl. No.: 18/834,674

(22) PCT Filed: Feb. 7, 2022

(86) PCT No.: PCT/JP2022/004590
§ 371 (c)(1),
(2) Date: Jul. 31, 2024

(87) PCT Pub. No.: WO2023/148951
PCT Pub. Date: Aug. 10, 2023

(65) Prior Publication Data

US 2025/0139221 A1 May 1, 2025

(51) Int. Cl.
*G06F 21/44* (2013.01)
*G06F 9/54* (2006.01)
*G06F 11/07* (2006.01)

(52) U.S. Cl.
CPC ................ *G06F 21/44* (2013.01); *G06F 9/54* (2013.01); *G06F 11/0793* (2013.01)

(58) Field of Classification Search
CPC ............. G06F 21/44; G06F 9/54; G06F 21/57
See application file for complete search history.

(56) References Cited

U.S. PATENT DOCUMENTS 10,313,339 B1 * 6/2019 Power ................. H04L 63/0876
11,233,791 B2 1/2022 Lewis et al.
2021/0051146 A1 * 2/2021 Stolbikov ............. H04L 63/061
2022/0038458 A1 2/2022 Vegh et al.
2023/0147082 A1 * 5/2023 Morita .................... G06F 21/57 726/21

FOREIGN PATENT DOCUMENTS

JP 2012-009938 A 1/2012
JP 2013-110460 A 6/2013
(Continued)

OTHER PUBLICATIONS

International Search Report for PCT Application No. PCT/JP2022/004590, mailed on Apr. 26, 2022.
(Continued)

*Primary Examiner* — Pramila Parthasarathy
(74) *Attorney, Agent, or Firm* — Sughrue Mion, PLLC

(57) ABSTRACT

This information communication system comprises a communication instrument and a verification device that verifies the authenticity of the communication instrument, the information communication system also comprising: a verification means for verifying the authenticity of each of a plurality of apparatuses managed by the communication instrument; and a notification means that, when an abnormality regarding the authenticity of one of the plurality of apparatuses is detected, issues a report on the abnormality of the apparatus to the verification device.

18 Claims, 9 Drawing Sheets

(56) References Cited

FOREIGN PATENT DOCUMENTS

| | | | |
|---|---|---|---|
| JP | 2015-018477 | A | 1/2015 |
| JP | 2016-039564 | A | 3/2016 |
| JP | 2016-139883 | A | 8/2016 |
| JP | 2018-081349 | A | 5/2018 |
| JP | 2020-005234 | A | 1/2020 |

OTHER PUBLICATIONS

English translation of Written opinion for PCT Application No. PCT/JP2022/004590, mailed on Apr. 26, 2022.
US Office Action for U.S. Appl. No. 18/728,911, mailed on Oct. 2, 2025.
JP Office Action for JP Application No. 2023-576558, mailed on Jul. 8, 2025.
US Office Action for U.S. Appl. No. 18/728,911, mailed on Apr. 3, 2026.

* cited by examiner

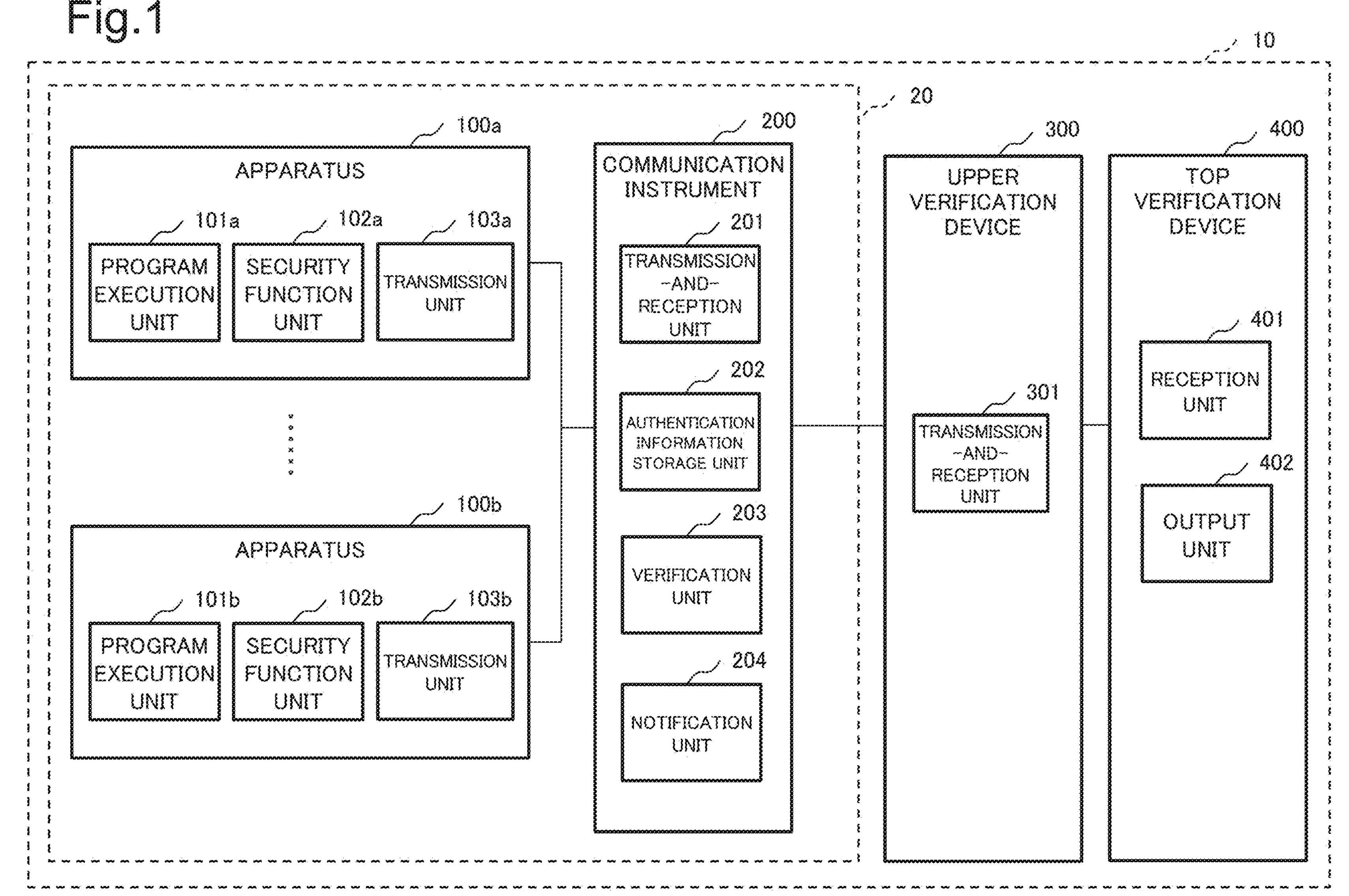
Fig.1
10
20
100a
APPARATUS
101a
PROGRAM EXECUTION UNIT
102a
SECURITY FUNCTION UNIT
103a
TRANSMISSION UNIT
100b
APPARATUS
101b
PROGRAM EXECUTION UNIT
102b
SECURITY FUNCTION UNIT
103b
TRANSMISSION UNIT
200
COMMUNICATION INSTRUMENT
201
TRANSMISSION -AND- RECEPTION UNIT
202
AUTHENTICATION INFORMATION STORAGE UNIT
203
VERIFICATION UNIT
204
NOTIFICATION UNIT
300
UPPER VERIFICATION DEVICE
301
TRANSMISSION -AND- RECEPTION UNIT
400
TOP VERIFICATION DEVICE
401
RECEPTION UNIT
402
OUTPUT UNIT 500
507
DRIVE DEVICE
501
CPU
502
ROM
503
RAM
509
INPUT DEVICE
510
OUTPUT DEVICE
512
STORAGE DEVICE
505
504
PROGRAM
COMMUNICATION INTERFACE
508
INPUT-AND-OUTPUT INTERFACE
511
PERIPHERAL DEVICE
COMMUNICATION NETWORK
506
RECORDING MEDIUM

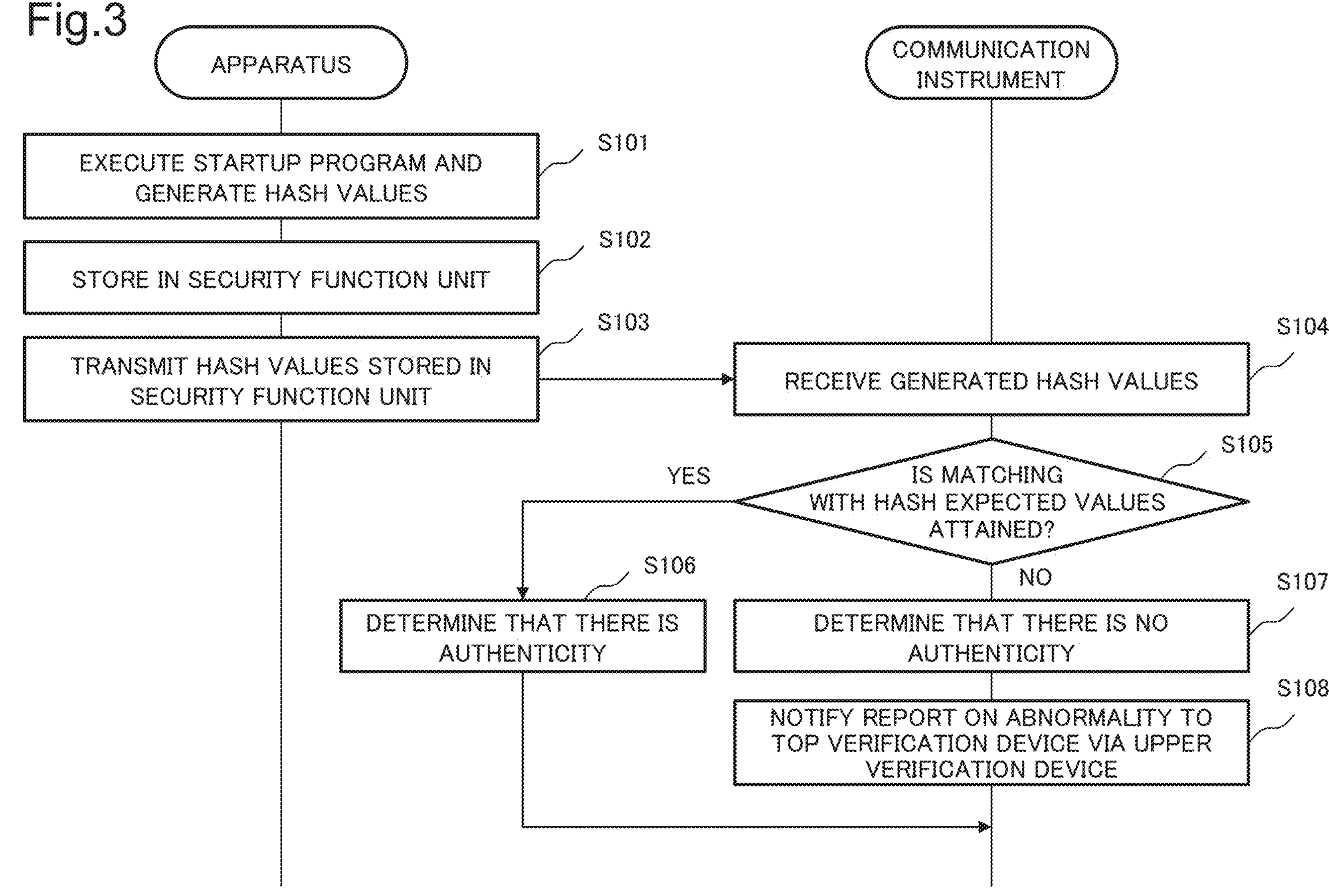
Fig.3
APPARATUS
COMMUNICATION INSTRUMENT
EXECUTE STARTUP PROGRAM AND GENERATE HASH VALUES
S101
STORE IN SECURITY FUNCTION UNIT
S102
TRANSMIT HASH VALUES STORED IN SECURITY FUNCTION UNIT
S103
RECEIVE GENERATED HASH VALUES
S104
IS MATCHING WITH HASH EXPECTED VALUES ATTAINED?
S105
YES
NO
DETERMINE THAT THERE IS AUTHENTICITY
S106
DETERMINE THAT THERE IS NO AUTHENTICITY
S107
NOTIFY REPORT ON ABNORMALITY TO TOP VERIFICATION DEVICE VIA UPPER VERIFICATION DEVICE
S108

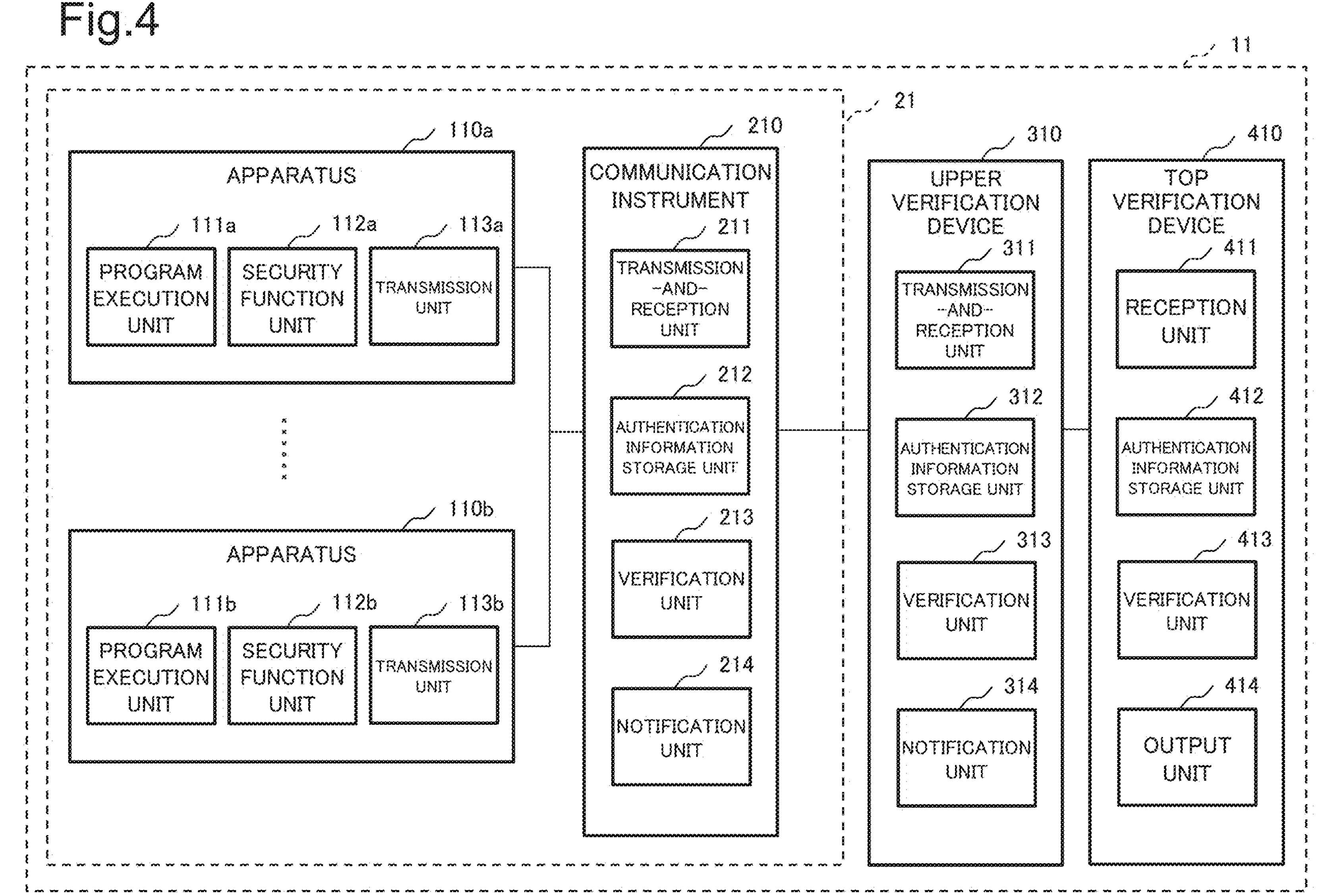
Fig.4
11
21
110a
APPARATUS
111a
PROGRAM EXECUTION UNIT
112a
SECURITY FUNCTION UNIT
113a
TRANSMISSION UNIT
110b
APPARATUS
111b
PROGRAM EXECUTION UNIT
112b
SECURITY FUNCTION UNIT
113b
TRANSMISSION UNIT
210
COMMUNICATION INSTRUMENT
211
TRANSMISSION -AND- RECEPTION UNIT
212
AUTHENTICATION INFORMATION STORAGE UNIT
213
VERIFICATION UNIT
214
NOTIFICATION UNIT
310
UPPER VERIFICATION DEVICE
311
TRANSMISSION -AND- RECEPTION UNIT
312
AUTHENTICATION INFORMATION STORAGE UNIT
313
VERIFICATION UNIT
314
NOTIFICATION UNIT
410
TOP VERIFICATION DEVICE
411
RECEPTION UNIT
412
AUTHENTICATION INFORMATION STORAGE UNIT
413
VERIFICATION UNIT
414
OUTPUT UNIT

| APPARATUS | NORMAL/ ABNORMAL | DATE AND TIME OF VERIFICATION |
|---|---|---|
| A | NORMAL | 2021/8/25 12:00 |
| B | NORMAL | 2021/8/25 12:00 |
| C | ABNORMAL | 2021/8/25 12:00 |
| D | NORMAL | 2021/8/25 06:00 |
| E | NORMAL | 2021/8/25 06:00 |
| F | NORMAL | 2021/8/25 06:00 |

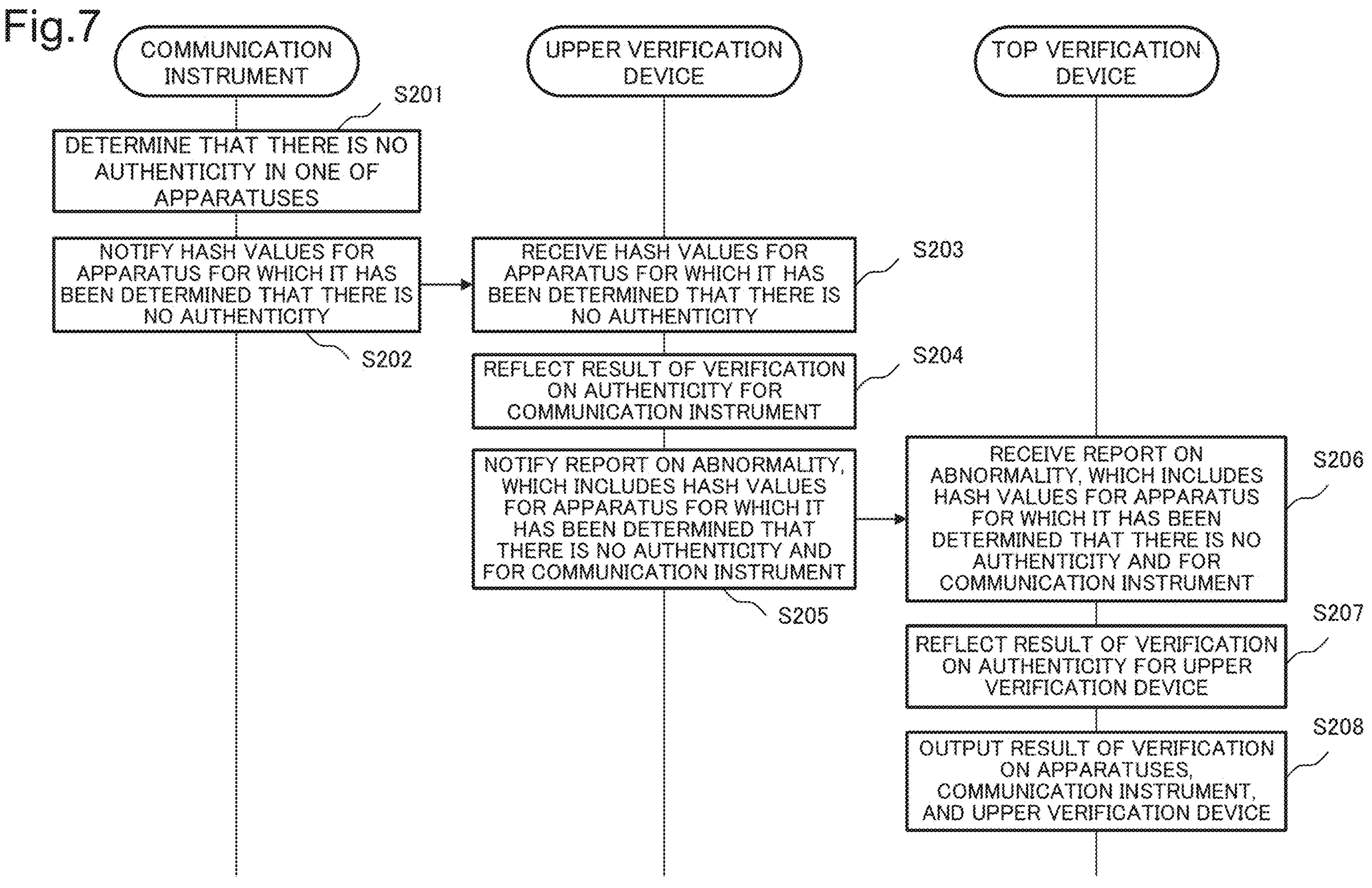
Fig. 7
COMMUNICATION INSTRUMENT
UPPER VERIFICATION DEVICE
TOP VERIFICATION DEVICE
S201
DETERMINE THAT THERE IS NO AUTHENTICITY IN ONE OF APPARATUSES
NOTIFY HASH VALUES FOR APPARATUS FOR WHICH IT HAS BEEN DETERMINED THAT THERE IS NO AUTHENTICITY
S202
RECEIVE HASH VALUES FOR APPARATUS FOR WHICH IT HAS BEEN DETERMINED THAT THERE IS NO AUTHENTICITY
S203
REFLECT RESULT OF VERIFICATION ON AUTHENTICITY FOR COMMUNICATION INSTRUMENT
S204
NOTIFY REPORT ON ABNORMALITY, WHICH INCLUDES HASH VALUES FOR APPARATUS FOR WHICH IT HAS BEEN DETERMINED THAT THERE IS NO AUTHENTICITY AND FOR COMMUNICATION INSTRUMENT
S205
RECEIVE REPORT ON ABNORMALITY, WHICH INCLUDES HASH VALUES FOR APPARATUS FOR WHICH IT HAS BEEN DETERMINED THAT THERE IS NO AUTHENTICITY AND FOR COMMUNICATION INSTRUMENT
S206
REFLECT RESULT OF VERIFICATION ON AUTHENTICITY FOR UPPER VERIFICATION DEVICE
S207
OUTPUT RESULT OF VERIFICATION ON APPARATUSES, COMMUNICATION INSTRUMENT, AND UPPER VERIFICATION DEVICE
S208

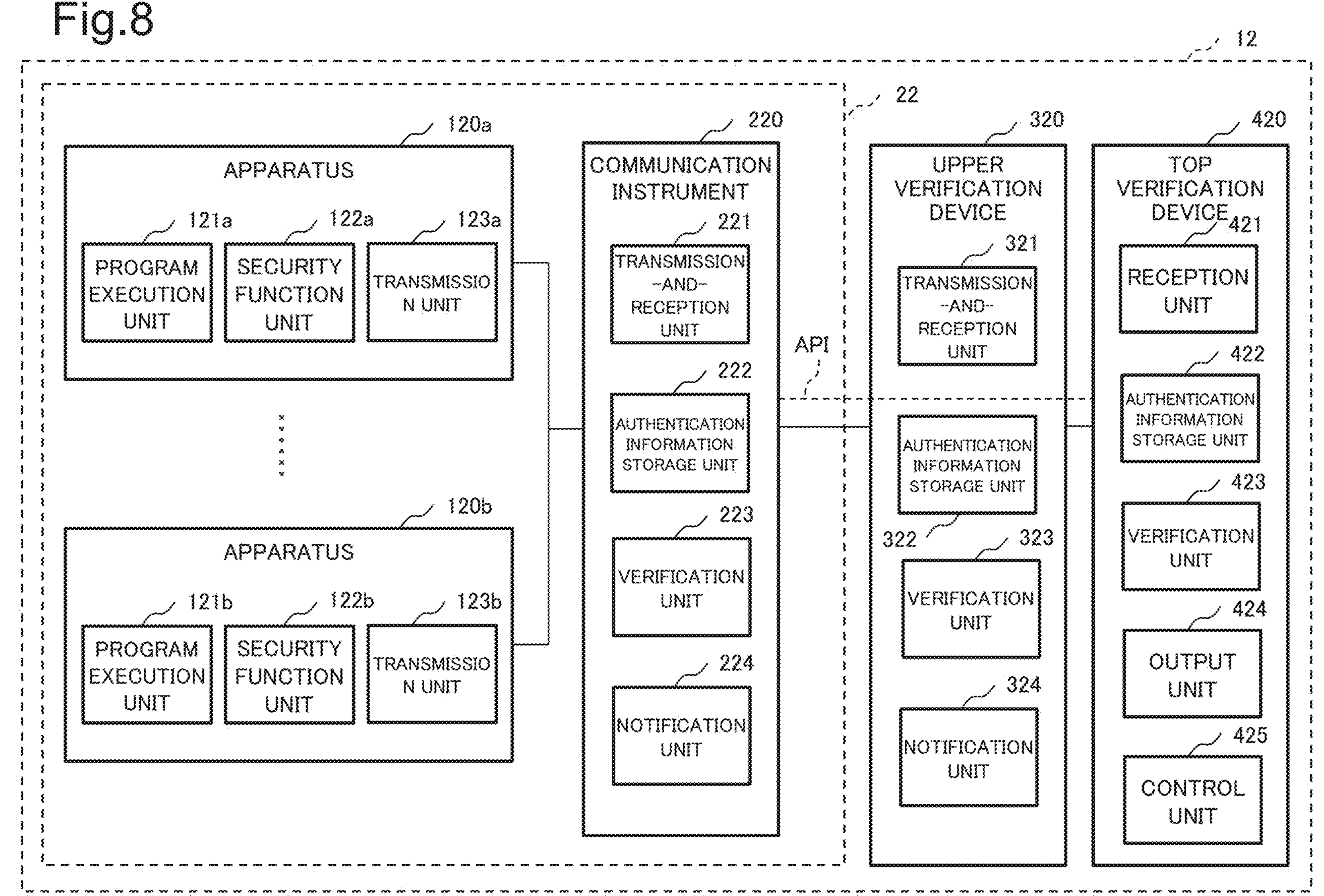
Fig.8
12
22
120a
APPARATUS
121a
PROGRAM EXECUTION UNIT
122a
SECURITY FUNCTION UNIT
123a
TRANSMISSIO N UNIT
120b
APPARATUS
121b
PROGRAM EXECUTION UNIT
122b
SECURITY FUNCTION UNIT
123b
TRANSMISSIO N UNIT
220
COMMUNICATION INSTRUMENT
221
TRANSMISSION -AND- RECEPTION UNIT
222
AUTHENTICATION INFORMATION STORAGE UNIT
223
VERIFICATION UNIT
224
NOTIFICATION UNIT
API
320
UPPER VERIFICATION DEVICE
321
TRANSMISSION -AND- RECEPTION UNIT
322
AUTHENTICATION INFORMATION STORAGE UNIT
323
VERIFICATION UNIT
324
NOTIFICATION UNIT
420
TOP VERIFICATION DEVICE
421
RECEPTION UNIT
422
AUTHENTICATION INFORMATION STORAGE UNIT
423
VERIFICATION UNIT
424
OUTPUT UNIT
425
CONTROL UNIT

Fig.9

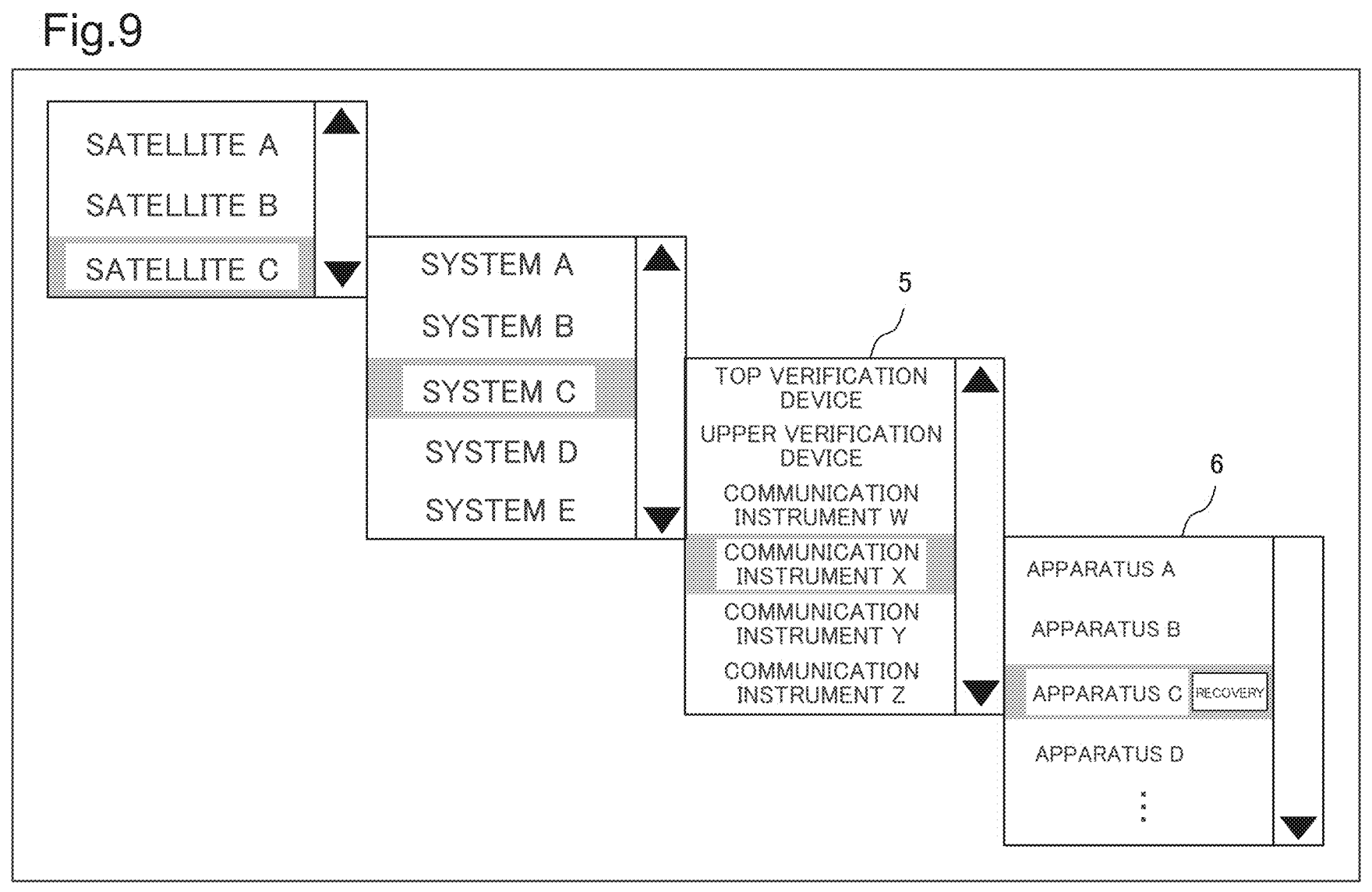

SATELLITE A
SATELLITE B
SATELLITE C

SYSTEM A
SYSTEM B
SYSTEM C
SYSTEM D
SYSTEM E

5

TOP VERIFICATION DEVICE
UPPER VERIFICATION DEVICE
COMMUNICATION INSTRUMENT W
COMMUNICATION INSTRUMENT X
COMMUNICATION INSTRUMENT Y
COMMUNICATION INSTRUMENT Z

6

APPARATUS A
APPARATUS B
APPARATUS C
RECOVERY
APPARATUS D
⋮

INFORMATION COMMUNICATION SYSTEM, INFORMATION COMMUNICATION METHOD, AND RECORDING MEDIUM

This application is a National Stage Entry of PCT/JP2022/004590 filed on Feb. 7, 2022, the contents of all of which are incorporated herein by reference, in their entirety.

TECHNICAL FIELD

The present disclosure relates to an information communication system, an information communication method, and a recording medium.

BACKGROUND ART

Cyber-attacks on apparatuses (edge computers) installed in various work sites have become realistic. For example, when a system constructed by a system vendor is to be delivered to a customer, unauthorized falsification is performed on an apparatus by a malicious third party, and the system may operate in an abnormal manner. Unauthorized falsification may be performed while an apparatus is transported or stored in a warehouse, or when there is illegal intrusion into a system after constructed, for example.

In response to such activities, it is known to verify authenticity for an apparatus before a system is started to prevent the system from operating in an abnormal manner. For example, PTL 1 discloses a technique in which, in a communication system including an apparatus and a smart meter, an authentication request is made from the apparatus to the smart meter, and data regarding the apparatus is read after authentication processing is performed.

CITATION LIST

Patent Literature

PTL 1: JP 2016-039564 A

SUMMARY OF INVENTION

Technical Problem

However, the invention described in PTL 1 executes authentication processing for each apparatus. For this reason, when a system to be verified has layers in its configuration and a plurality of apparatuses located in a lowest layer are arranged in a branched state, for example, it is not possible to identify one of the apparatuses in which there is an abnormality and to identify an instrument that is managing the one of the apparatuses.

An example of an object of the present disclosure is to provide an information communication system capable of identifying an instrument that is managing an apparatus in which an abnormality has been detected even when a system to be verified has layers in its configuration.

Solution to Problem

An information communication system according to one aspect of the present disclosure is an information communication system provided with a communication instrument and a verification device that verifies authenticity for the communication instrument, the information communication system including: a verification means for verifying authenticity for each of a plurality of apparatuses managed by the communication instrument; and a notification means for notifying, when an abnormality regarding the authenticity for one of the plurality of apparatuses is detected, a report on the abnormality in the one of the plurality of apparatuses to the verification device.

An information communication method according to one aspect of the present disclosure includes: verifying authenticity for each of a plurality of apparatuses managed by a communication instrument; and notifying, when an abnormality regarding authenticity has been detected in one of the plurality of apparatuses, a report on the abnormality in the one of the plurality of apparatuses to a verification device existing above the communication instrument.

A recording medium according to one aspect of the present disclosure stores a program for causing a computer to execute: verifying authenticity for each of a plurality of apparatuses managed by a communication instrument; and notifying, when an abnormality regarding authenticity has been detected in one of the plurality of apparatuses, a report on the abnormality in the one of the plurality of apparatuses to a verification device existing above the communication instrument.

Advantageous Effects of Invention

With an example of an effect of the present disclosure, it is possible to provide an information communication system capable of identifying an instrument that is managing an apparatus in which an abnormality has been detected even when a system to be verified has layers in its configuration.

BRIEF DESCRIPTION OF DRAWINGS

FIG. 1 is a diagram illustrating a configuration of an information communication system according to a first example embodiment.

FIG. 3 is a flowchart illustrating operation of the information communication system according to the first example embodiment.

FIG. 4 is a diagram illustrating a configuration of an information communication system according to a second example embodiment.

FIG. 7 is a flowchart illustrating operation of the information communication system according to the second example embodiment.

FIG. 8 is a diagram illustrating a configuration of an information communication system according to a third example embodiment.

FIG. 9 is an output example of results of verification by an output unit according to the third example embodiment.

EXAMPLE EMBODIMENTS

Figure 2:
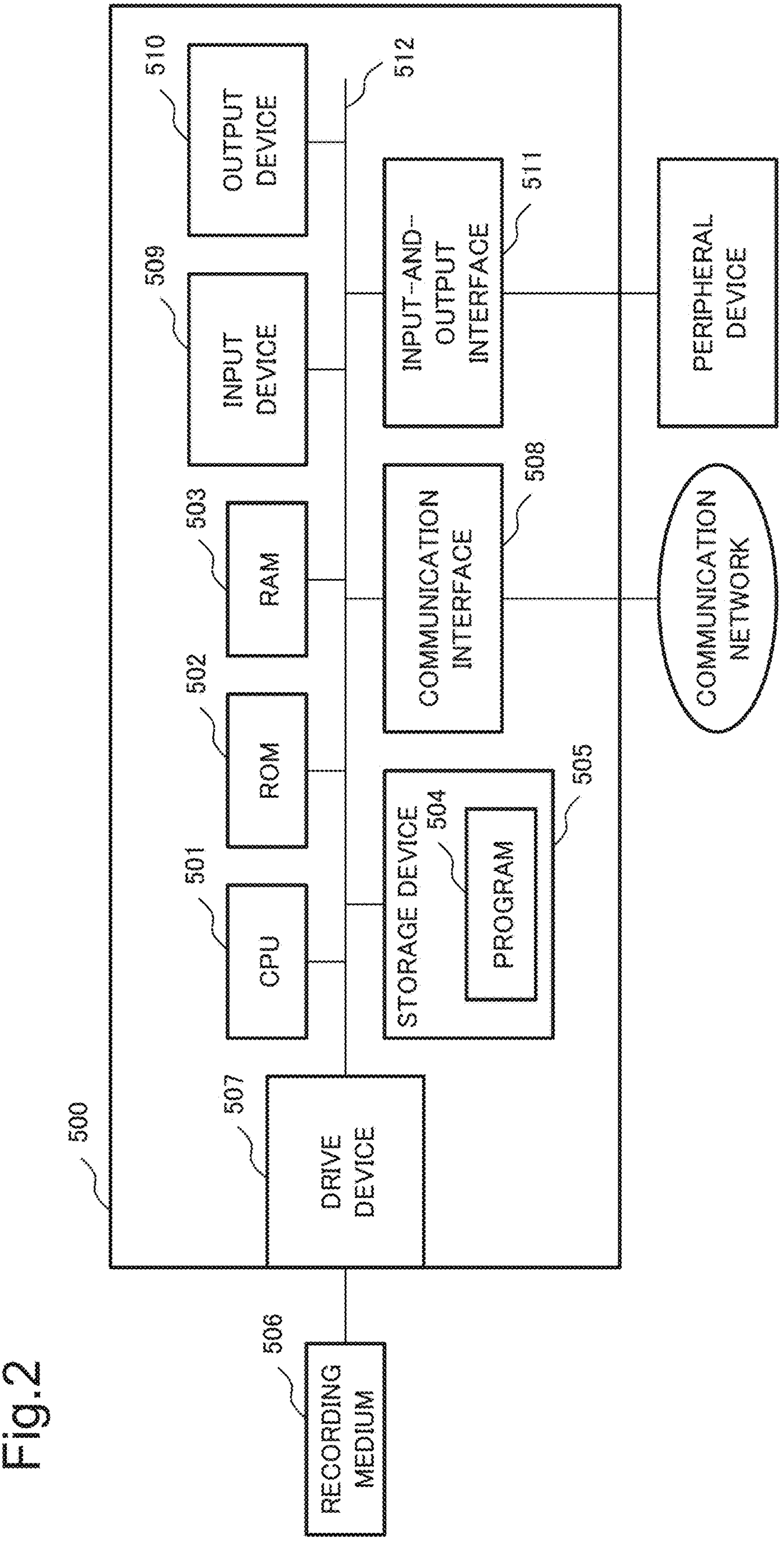
FIG. 2 is a diagram illustrating a hardware configuration in which an apparatus and a communication instrument according to the first example embodiment are achieved by a computer device and its peripheral devices.

Next, example embodiments will now be described herein in detail with reference to the accompanying drawings.

First Example Embodiment

FIG. 1 is a diagram illustrating a configuration of an information communication system 10 according to a first example embodiment. Referring to FIG. 1, the information communication system 10 includes a plurality of apparatuses 100 (100*a*, 100*b*), a communication instrument 200, an upper verification device 300, and a top verification device 400. An internal system 20 includes the plurality of apparatuses 100 and the communication instrument 200. The information communication system 10 according to the first example embodiment has a layered structure in which the top verification device 400 exists in a top layer, there are a plurality of the upper verification devices 300 managed by the top verification device 400, and there are a plurality of the internal systems 20 (the communication instruments 200) each managed by each of the upper verification devices 300. There are cases of the plurality of upper verification devices 300, where there are the plurality of upper verification devices 300 exist in an identical layer and there are the upper verification device 30 exist in each of a plurality of layers.

The communication instrument 200 serving as an upper verification device verifies authenticity for each of the apparatuses 100 based on hash values for components in and programs for each of the apparatuses 100, which are generated when each of the apparatuses is started. The communication instrument 200 verifies the authenticity in a series of startup operation until a program such as an operating system (OS) is started, which is initiated as a power supply to each of the apparatuses 100 is turned on, for example. When it is detected that there is an abnormality regarding the authenticity for one of the apparatuses 100, the communication instrument 200 notifies a report on the abnormality to the top verification device 400 via the upper verification device 300. For example, the information communication system 10 verifies the authenticity for each of the apparatuses 100 each time startup operation for each of the apparatuses 100 is initiated. In the present example embodiment, the term "authenticity" means a state in which only tested known components and programs are operating in each of the apparatuses 100, and unauthorized falsification is not performed while the apparatuses are supplied and the system is constructed.

The internal system 20 is a system that becomes a closed environment when a network such as satellite communication or wireless communication with a data center such as a system installed in a remote place is completely disconnected. The internal system 20 is, for example, an equipment system that controls, in a real time manner, equipment for a vehicle, a ship, or an aircraft, for example. In the information communication system 10, the communication instrument 200 aggregates results of verification on the apparatuses 100, and transmits the results to the top verification device 400 via the upper verification device 300 by using satellite communication or wireless communication. The communication instrument 200 may transmit a result of verification on each of the apparatuses 100 to the top verification device 400 via the upper verification device 300 via another communication instrument 200 managed by the identical upper verification device. When the internal system 20 is disconnected from the information communication system 10 and becomes a closed environment, an abnormality as a result of verification on each of the apparatuses 100 may be notified by a lamp or a buzzer provided in the communication instrument 200, as will be described later. When the internal system 20 is an equipment system, a result of verification may be transmitted to the top verification device 400 via the upper verification device via the communication instrument 200 in another vehicle, ship, or aircraft through wireless communication. Another system corresponding to the internal system 20 is a system used for an operational technology (OT) in a connected car or a factory, for example.

FIG. 2 is a diagram illustrating an example of a hardware configuration in which each of the apparatuses 100 and the communication instrument 200 according to the first example embodiment of the present disclosure is achieved by a computer device 500 including a processor. As illustrated in FIG. 2, each of the apparatuses 100 and the communication instrument 200 includes a central processing unit (CPU) 501, a memory including a read only memory (ROM) 502 and a random access memory (RAM) 503, for example, a storage device 505 such as a hard disk that stores a program 504, a communication interface (I/F) 508 for network connection, and an input-and-output interface 511 for inputting and outputting data.

The CPU 501 causes the OS to operate to wholly control the apparatuses 100, the communication instrument 200, the upper verification device 300, and the top verification device 400 according to the first example embodiment of the present invention. The CPU 501 reads programs and data from a recording medium 506 mounted on a drive device 507 and outputs the read programs and data to the memory, for example. The CPU 501 functions as a whole of or a part of an achievement means for the components included in each of the apparatuses 100, the communication instrument 200, the upper verification device 300, and the top verification device 400 according to the first example embodiment, and executes processing or commands in a flowchart illustrated in FIG. 3 described later based on the programs.

The recording medium 506 is an optical disk, a flexible disk, a magnetic optical disk, an external hard disk, or a semiconductor memory, for example. The recording medium serving as a part of the storage device is a non-volatile storage device, in which the programs are recorded. The programs may be downloaded from a non-illustrated external computer coupled to a communication network.

An input device 509 is achieved by a mouse, a keyboard, and built-in key buttons, for example, and is used for input operation. The input device 509 is not limited to include a mouse, a keyboard, and built-in key buttons, and may include a touch panel, for example. An output device 510 is achieved by a display, for example, and is used to confirm an output.

As described above, the first example embodiment illustrated in FIG. 1 is achieved by a computer and hardware as illustrated in FIG. 2. However, the achievement means for the components included in each of the apparatuses 100, the communication instrument 200, the upper verification device 300, and the top verification device 400 illustrated in FIG. 1 is not limited to have the configuration described above.

<Apparatus 100>

Each of the apparatuses 100 (100*a*, 100*b*) includes a program execution unit 101 (101*a*, 101*b*), a security function unit 102 (102*a*, 102*b*), and a transmission unit 103 (103*a*, 103*b*). Although a number of the plurality of apparatuses 100 illustrated in FIG. 1 is two, the number of the plurality of apparatuses 100 is not limited to two. The number of the plurality of apparatuses 100 corresponds to the number of apparatuses actually existing in the internal system 20.

The program execution unit 101 executes a startup program for the apparatus 100 and generates hash values for the components and the startup program. When the power supply to the apparatus 100 is turned on, for example, the program execution unit 101 executes programs that are a boot loader, a basic input output system (BIOS) or unified extensible firmware interface (UEFI), and the OS in order. However, programs to be executed are not limited to these programs. The programs may be programs in which only the boot loader exists, or may be programs in which the boot loader itself has multiple stages. While the programs are executed and when the hash values for the components including the CPU, for example, and the hash values for the programs including the startup program, for example, are generated, the program execution unit 101 inputs the generated hash values to the security function unit 102. The hash values may be each electronically signed to secure authenticity for the hash value itself.

The security function unit 102 includes a storage region having tamper resistance. The security function unit 102 serves as a region that is difficult to be tampered by a malicious third party. The security function unit 102 stores the hash values inputted from the program execution unit 101, and may have an encryption key required for encryption processing for securely transmitting the hash values to the communication instrument 200, or may have an attribute certificate defining a source from which information has been transmitted. The security function unit 102 includes, but not limited to, a trusted platform module (TPM), for example, as long as it is possible to achieve the tamper resistance. The TPM has a characteristic that it is difficult to tamper with the OS or hardware through external physical hacking, and thus has high tamper resistance.

The transmission unit 103 transmits the hash values stored in the security function unit 102 to the communication instrument 200 to request for verification on authenticity for the apparatus 100.

<Communication Instrument 200>

The communication instrument 200 includes a transmission-and-reception unit 201, an authentication information storage unit 202, a verification unit 203, and a notification unit 204. The communication instrument 200 may be configured by a single virtualization server operated as a plurality of servers.

The transmission-and-reception unit 201 receives data transmitted from the apparatuses 100 and transmits the data to the upper verification device 300. The transmission-and-reception unit 201 may have a firewall function in the internal system 20. That is, the transmission-and-reception unit 201 determines whether to allow network communication with one that exists outside the internal system 20, and permits or rejects the network communication.

The authentication information storage unit 202 stores hash expected values for the components in each of the apparatuses 100 and the programs. The hash expected values are normal hash values generated when there is no unauthorized falsification on the components and the startup program. The authentication information storage unit 202 stores in advance the hash expected values received from each of the apparatuses 100 via the transmission-and-reception unit 201.

The verification unit 203 verifies the authenticity for the components in each of the apparatuses 100 and the startup program executed by each of the apparatuses 100. The verification unit 203 determines, with a binary value, for example, whether the authenticity is secured. Upon reception of a request for verification from one of the apparatuses 100, the verification unit 203 compares the hash values generated when the startup program is executed with the hash expected values stored in the authentication information storage unit 202. However, a method of performing verification by the verification unit 203 is not limited to the verification method described above, and may be a desired method as long as the method makes it possible to confirm that the hash values when the startup program is executed correspond to the normal hash values.

When the hash values acquired after starting up are identical to the hash expected values, the verification unit 203 determines that there is authenticity and outputs a result of the verification to the notification unit 204. When the acquired hash values are different from the hash expected values, the verification unit 203 determines that there is no authenticity and outputs a result of the verification to the notification unit 204. When the hash value for one of the programs for each of the apparatuses 100 does not match the hash expected value, the verification unit 203 may determine that there is no authenticity at that time and output a result of the verification to the notification unit 204.

When an abnormality regarding authenticity for one of the plurality of apparatuses 100 managed by the communication instrument 200 is detected, the notification unit 204 notifies a report on the abnormality in the apparatus 100 to the upper verification device 300. The notification unit 204 may notify, to the upper verification device 300, a report on the abnormality at a timing when a result of the verification, which indicates that there is no authenticity, has been received from the verification unit 203. The notification unit 204 may notify, to the upper verification device 300, a report on the abnormality when there is a request for transmitting a result of the verification on authenticity from the top verification device 400 via the upper verification device 300. The notification unit 204 may perform control for causing the output device 510 such as a display device to display information indicating a report on an abnormality in one of the apparatuses 100. When a result of verification, which indicates that there is no authenticity, is received, the notification unit 204 may notify that there is an abnormality by a lamp or a buzzer provided in the communication instrument 200. In this case, even when the internal system 20 has been disconnected from the information communication system 10 and becomes a closed environment, it is possible to notify the abnormality in the apparatus 100.

<Upper Verification Device 300>

The upper verification device 300 includes a transmission-and-reception unit 301, and, when a report on an abnormality is received from the communication instrument 200, notifies the report on the abnormality as is to the top verification device 400.

<Top Verification Device 400>

The top verification device 400 includes a reception unit 401 and an output unit 402. The reception unit 401 receives a report on an abnormality from the upper verification device 300. The output unit 402 outputs the received report on the abnormality. The output unit 402 outputs a fact that the report on the abnormality has been received to the output device 510 such as a display device.

Operation of the information communication system 10 configured as described above will now be described herein with reference to the flowchart illustrated in FIG. 3.

FIG. 3 is a flowchart illustrating an outline of operation of the information communication system 10 according to the first example embodiment. The processing in accordance with this flowchart may be executed based on program control by the processor described above.

As illustrated in FIG. 3, the program execution unit 101 in the apparatus 100 first executes the startup program, generates hash values for the components and the startup program (step S101), and stores the generated hash values in the security function unit 102 (step S102). The transmission unit 103 transmits the hash values stored in the security function unit 102 to the communication instrument 200 (step S103). Next, the transmission-and-reception unit 201 in the communication instrument 200 receives the generated hash values (step S104). Next, the verification unit 203 compares the generated hash values with the hash expected values stored in the authentication information storage unit 202 (step S105). When the generated hash values match the hash expected values (S105; YES), the verification unit 203 determines that there is authenticity (step S106), and the flow ends. When the generated hash values do not match the hash expected values (S105; NO), on the other hand, the verification unit 203 determines that there is no authenticity (step S107), and the notification unit 204 notifies a report on the abnormality to the top verification device 400 via the upper verification device 300 (step S108). The information communication system 10 thus ends operation of information communication.

In the first example embodiment, when it is determined that there is no authenticity in one of the apparatuses 100 managed by the communication instrument 200, the notification unit 204 notifies a report on the abnormality to the top verification device 400 via the upper verification device 300. Therefore, the top verification device 400 is able to identify that the one of the apparatuses 100 that are existing and managed by the upper verification device 300 that has received the report on the abnormality is abnormal. Therefore, even when a system to be verified has layers in its configuration, it is possible to identify an instrument that is managing an apparatus 100 in which an abnormality has been detected.

Next, a modification example of the first example embodiment of the present disclosure will now be described herein. When an abnormality regarding authenticity has been detected in one of the apparatuses 100 managed by the communication instrument 200 in the first example embodiment, a report on the abnormality is notified to the top verification device 400 via the upper verification device 300. In this case, the top verification device 400 may request the upper verification device 300 to transmit information identifying the communication instrument 200 that has notified the report on the abnormality, at a timing when the report on the abnormality has been received. The top verification device 400 may further request the communication instrument 200, via the upper verification device 300, to transmit information identifying the apparatus 100 in which the abnormality regarding authenticity has been detected. As a result, the top verification device 400 is able to notify, to an administrator managing the information communication system 10, information identifying the apparatus 100 in which the abnormality has been detected, or identifying the communication instrument 200 managing the apparatus 100.

Next, a second example embodiment of the present disclosure will now be described herein. Description of contents overlapping with the above description will be hereinafter omitted to an extent that the description of the present example embodiment is not unclear. Similar to the computer device illustrated in FIG. 2, it is possible to achieve each of components in each of example embodiments of the present disclosure by not only hardware but also a computer device or software based on program control.

FIG. 4 is a diagram illustrating a configuration of an information communication system 11 according to the second example embodiment. The second example embodiment is different from the first example embodiment in configuration in a notification unit 214 in a communication instrument 210 and in configuration in an upper verification device 310 and a top verification device 410. The upper verification device 310 includes a transmission-and-reception unit 311, an authentication information storage unit 312, a verification unit 313, and a notification unit 314. The top verification device 410 includes a reception unit 411, an authentication information storage unit 412, a verification unit 413, and an output unit 414.

<Communication Instrument 210>

When a result of verification, which indicates that there is no authenticity, is received from a verification unit 213, in the second example embodiment, the notification unit 214 includes information of the apparatus 110 for which it has been determined that there is no authenticity in a report on an abnormality, and notifies the report on the abnormality to the upper verification device 310. In this case, for example, the notification unit 214 may store a hash value of an identifier of the apparatus 110 for which it has been determined that there is no authenticity for a platform configuration register (PCR) number that is not used for verifying its authenticity in the TPM, and may notify the stored hash value to the upper verification device 310.

<Upper Verification Device 310>

Upon reception of a report on an abnormality, which has been received from the communication instrument 210, the transmission-and-reception unit 311 outputs, to the notification unit 314, a fact that the report on the abnormality has been received.

The authentication information storage unit 312 stores hash expected values for the components in and the startup program for the communication instrument 210.

The verification unit 313 verifies authenticity for the communication instrument 210 at a timing when the communication instrument 210 is started. The verification unit 313 verifies the authenticity for the communication instrument 210 based on the hash values generated when the communication instrument 210 is started and the hash expected values stored in the authentication information storage unit 312. A method for verifying authenticity, which is executed by the verification unit 313, is similar to the method for verifying authenticity for each of the apparatuses 100 by the communication instrument 200, according to the first example embodiment. The verification unit 313 outputs a result of the verification to the notification unit 214 only when it is determined that there is no authenticity for the communication instrument 210. When it is determined that there is authenticity for the communication instrument 210, on the other hand, the verification unit 313 does not output a result of the verification to the notification unit 214.

The notification unit 314 notifies a report on an abnormality to the top verification device 410. The notification unit 314 holds the result of the verification on the authenticity for the communication instrument 210, which has been inputted from the verification unit 313. As a report on an abnormality is inputted from the transmission-and-reception unit 311, the notification unit 314 reflects the result of the verification on the authenticity for the communication instrument 210 to the report on the abnormality and notifies the report on the abnormality to the top verification device 410. That is, when a result of verification on the authenticity for the communication instrument 210 has been received from the verification unit 313, the notification unit 314 notifies the report on the abnormality in the communication instrument 210, in addition to notifying the report on the abnormality in each of the apparatuses 110. When no result of verification on the authenticity for the communication instrument 210 has been received from the verification unit 313, on the other hand, the notification unit 314 notifies only the report on the abnormality in each of the apparatuses 110.

The notification unit 314 includes, in the report on the abnormality, information of the apparatus 110 for which it has been determined that there is no authenticity and the communication instrument 210, and notifies the report on the abnormality to the top verification device 410. Also in this case, the notification unit 314 may store hash values of identifiers of the apparatus 110 for which it has been determined that there is no authenticity for a PCR number that is not used for verifying its authenticity in the TPM and the communication instrument 210, and may notify the stored hash values to the top verification device 410. The notification unit 314 may perform control for causing the output device 510 such as a display device to display information indicating a report on the abnormality in one of the apparatuses 110 or the communication instrument 210. When a result of verification, which indicates that there is no authenticity, is received, the notification unit 314 may notify that there is an abnormality by a lamp or a buzzer provided in the upper verification device 310. In this case, even when a network between the upper verification device 310 and the top verification device 410 is disconnected, the upper verification device 310 is able to notify the abnormality in the communication instrument 210.

<Top Verification Device 410>

The top verification device 410 includes the reception unit 411, the authentication information storage unit 412, the verification unit 413, and the output unit 414.

Upon reception of a report on an abnormality, which includes a hash value, from the upper verification device 310, the reception unit 411 outputs, to the output unit 414, a fact that the report on the abnormality has been received.

The authentication information storage unit 412 stores hash expected values for the components in and the startup program for the upper verification device 310.

The verification unit 413 verifies authenticity for the upper verification device 310 at a timing when the upper verification device 310 is started. The verification unit 413 verifies the authenticity for the upper verification device 310 based on the hash values generated when the upper verification device 310 is started and the hash expected values stored in the authentication information storage unit 412. A method for verifying authenticity by the verification unit 413 is similar to the method for verifying authenticity for each of the apparatuses 100 by the communication instrument 200. When it is determined that there is no authenticity for the upper verification device 310, the verification unit 413 outputs a result of the verification to the output unit 414. When it is determined that there is authenticity for the upper verification device 310, on the other hand, the verification unit 413 does not output a result of the verification to the output unit 414.

The output unit 414 outputs a result of verification on authenticity for each of the apparatuses 110, the communication instrument 210, and the upper verification device 310 forming the information communication system 11. The output unit 414 holds the result of the verification on the authenticity for the upper verification device 310, which has been inputted from the verification unit 413. Upon reception of a report on an abnormality from the upper verification device 310, the output unit 414 identifies, based on the hash values included in the report on the abnormality and a result of verification, which is inputted from the verification unit 413, whether there is an abnormality in the components in each of layers in the information communication system 11, and displays whether there is an identified abnormality on the output device 510 such as a display device. In this case, the output unit 414 decodes the hash values included in the report on the abnormality and identifies the apparatus 110 in which the abnormality has been detected and the communication instrument 210. The output unit 414 identifies whether there is an abnormality in the upper verification device 310 based on whether a result of verification on the upper verification device 310 has been received from the verification unit 413. That is, when a result of verification on the upper verification device 310 has been received from the verification unit 413, the output unit 414 identifies that there is an abnormality in the upper verification device 310. When a result of verification on the upper verification device 310 has not yet been received from the verification unit 413, on the other hand, the output unit 414 identifies that the upper verification device 310 is normal.

Figure 5:
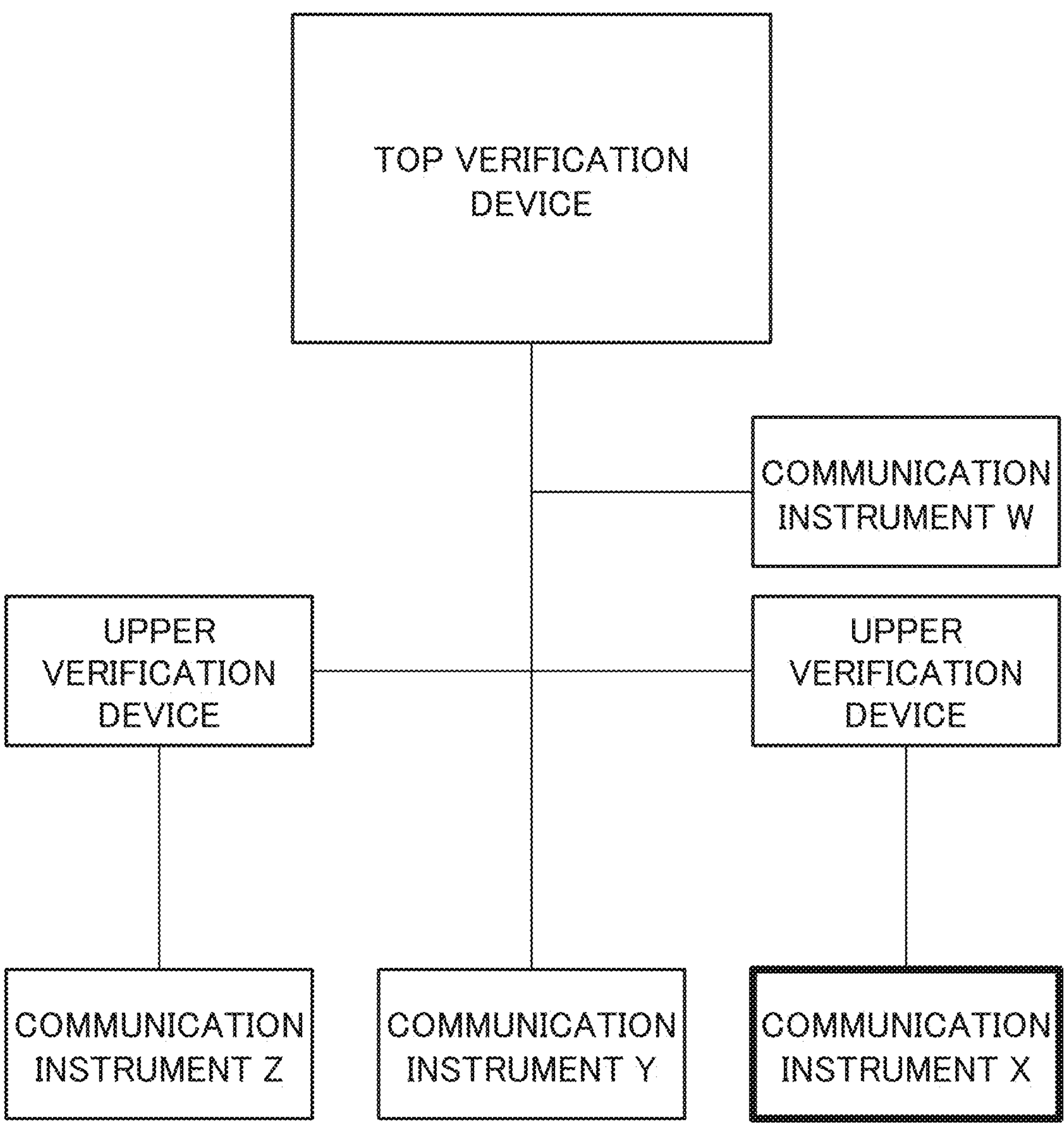
FIG. 5 is an output example of results of verification by an output unit according to the second example embodiment.
Figure 6:
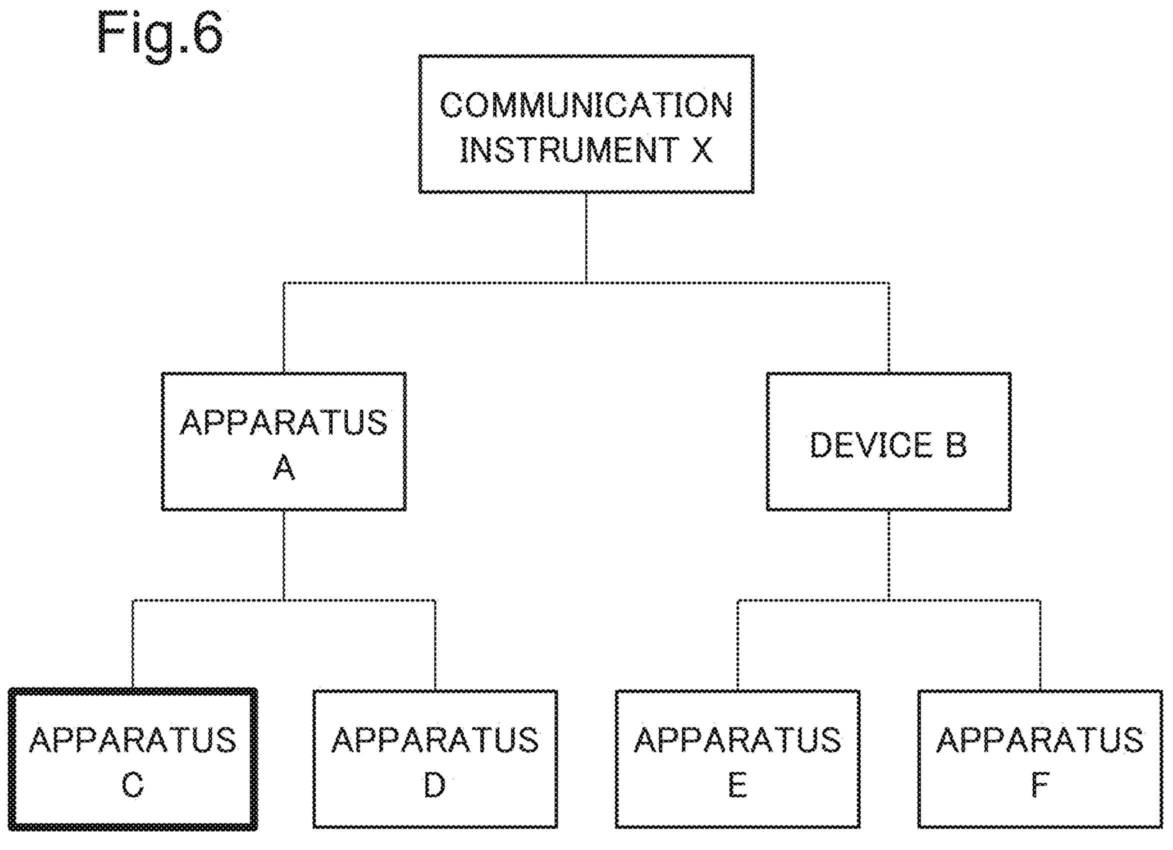
FIG. 6 is an output example of results of verification by the output unit according to the second example embodiment.

FIGS. 5 and 6 are output examples of results of verification by the output unit 414. FIG. 5 illustrates a configuration of the information communication system 11, and FIG. 6 illustrates a configuration of the apparatuses 110 managed by a communication instrument X and results of verification. When it has been detected that the communication instrument X illustrated in FIG. 5 has been selected, for example, the output unit 414 displays whether there is an abnormality in each of the apparatuses 110 managed by the communication instrument X and their dates and time of verification, as illustrated in FIG. 6. As illustrated in FIG. 6, the output unit 414 may highlight one or more of the apparatuses 110, in which an abnormality has been detected.

Operation of the information communication system 11 configured as described above will now be described herein with reference to the flowchart illustrated in FIG. 7.

FIG. 7 is a flowchart illustrating an outline of operation of the information communication system 11 according to the second example embodiment. The information communication system 11 according to the second example embodiment starts operation when the verification unit 213 in the communication instrument 210 has performed verification on authenticity for each of the apparatuses 110 and has determined that there is no authenticity for one of the apparatuses 110. The processing in accordance with this flowchart may be executed based on program control by the processor described above.

As illustrated in FIG. 7, when the verification unit 213 in the communication instrument 210 has determined that there is no authenticity for one of the apparatuses (step S201), the notification unit 214 first notifies hash values for the one of the apparatuses 110, for which it has been determined that there is no authenticity, to the upper verification device 310 (step S202). Next, the transmission-and-reception unit 311 in the upper verification device 310 receives the hash values received from the communication instrument 210 (step S203). Next, the notification unit 314 reflects a result of verification on authenticity for the communication instrument 210 (step S204). Next, the notification unit 314 notifies a report on the abnormality, which includes the hash values for the one of the apparatuses 110, for which it has been determined that there is no authenticity, and for the communication instrument, to the top verification device 410 (step S205). In the top verification device 410, when the reception unit 411 receives the report on the abnormality, which includes the hash values (step S206), the output unit 414 reflects a result of verification on authenticity for the upper verification device 310 (step S207). Next, the results of the verification on the authenticity for the components (the apparatuses 110, the communication instrument 210, and the upper verification device 310) included in the information communication system 11 is outputted (step S208). The information communication system 11 thus ends operation of the information communication.

In the information communication system 11 according to the present example embodiment, each of the communication instrument 210, the upper verification device 310, and the top verification device 410 performs verification on authenticity for the apparatuses or the instrument (the communication instrument) existing in layers below itself, and notifies a report on an abnormality, which includes information identifying one of the apparatuses or the instrument, for which it has been determined that there is no authenticity, to the top verification device 410. The output unit 414 in the top verification device 410 outputs a result of the verification on the authenticity for each of the components included in the information communication system 11. As a result, the administrator of the information communication system 11 is able to grasp the authenticity of the components included in the information communication system 11.

In the second example embodiment, at a timing when an abnormality regarding authenticity for one of the apparatuses 110 is detected, each of the verification units in the upper verification device 310 and the top verification device 410 sequentially performs verification on authenticity for the communication instrument 210 and the upper verification device 310 below the devices. However, a timing of performing verification, according to the present example embodiment, is not limited to the timing described above. At a timing when the communication instrument 210 and the upper verification device 310 are started, for example, the communication instrument 210 and the upper verification device 310 may make a request for verifying authenticity to their upper device, and each upper device may verify the authenticity for the communication instrument 210 or the upper verification device 310. In this case, similar to the second example embodiment, a report on the abnormality, which includes the hash values identifying the communication instrument 210 or the upper verification device 310, for which it has been determined that there is no authenticity, is transmitted to the top verification device 410.

Although, in the information communication system 11 according to the second example embodiment, the upper verification device 310 only exists between the communication instrument 210 and the top verification device 410, a plurality of the upper verification devices 310 may exist between the communication instrument 210 and the top verification device 410. Even in this case, each of the upper verification devices 310 includes the verification unit 313 that verifies the authenticity for the communication instrument 210 or the upper verification device 310 existing below the upper verification device 310 itself, and the notification unit 314 that notifies, when an abnormality has been detected as a result of verification on authenticity, a report on the abnormality to the upper verification device 310 or the top verification device 410 existing above the upper verification device itself.

Third Example Embodiment

Next, a third example embodiment of the present disclosure will now be described herein. Description of contents overlapping with the above description will be hereinafter omitted to an extent that the description of the present example embodiment is not unclear. Similar to the computer device illustrated in FIG. 2, it is possible to achieve each of components in each of example embodiments of the present disclosure by not only hardware but also a computer device or software based on program control.

In the third example embodiment, recovery of the program for an apparatus 120, for which an abnormality has been reported, in the second example embodiment, is executed.

FIG. 8 is a diagram illustrating a configuration of an information communication system 12 according to the first example embodiment. As illustrated in FIG. 8, the information communication system 12 includes an application programming interface (API) for recovering a program for one of the apparatuses, in which an abnormality has been detected, between a communication instrument 220 and a top verification device 420. The top verification device 420 further includes a control unit 425. In the communication instrument 220, a recovery program is encrypted and stored in the storage device 505.

The top verification device 420 includes a reception unit 421, an authentication information storage unit 422, a verification unit 423, an output unit 424, and the control unit 425.

The control unit 425 controls the communication instrument 220 that manages the apparatus 120 in which an abnormality regarding authenticity has been detected by the verification unit 423, and executes recovery operation for the apparatus 120. The control unit 425 may start an alternative apparatus provided in an internal system 22. In this case, the control unit 425 physically or logically disconnects the apparatus 120 in which the abnormality has been detected from the network, and starts the alternative apparatus in the internal system 22 through remote execution. The control unit 425 may instruct the communication instrument 220 to recover the program for the apparatus 120 in which the abnormality has been detected, through the API. Upon reception of the instruction from the control unit 425, the communication instrument 220 performs control to decode a recovery program stored in the storage device 505 and install the program on the apparatus 120 in which the abnormality regarding authenticity has been detected.

FIG. 9 is an output example of results of verification on authenticity by the output unit 424. As illustrated in FIG. 9, results of verification on the components in the information communication system 12 are displayed in a drilling down manner. In the example illustrated in FIG. 9, the components in the system illustrated in FIGS. 5 and 6 are displayed in a drilling down manner. The components in the system illustrated in FIG. 5 correspond to a list 5 illustrated in FIG. 9, and the components in the system illustrated in FIG. 6 correspond to a list 6 illustrated in FIG. 9. The components in the system illustrated in FIG. 9 correspond to a system C that performs satellite communication with a satellite C. As illustrated in FIG. 9, the output unit 424 may color and highlight displayed portions of an apparatus 120 in which an abnormality has been detected, a name of a communication instrument that manages the apparatus 120, a name of a system in which the communication instrument is installed, and a name of the satellite with which the system communicates. The names of the components in the information communication system 12 and their display methods are not limited to the example illustrated in FIG. 9. For example, instead of the name of the system illustrated in FIG. 9, for example, a name of an organization using the system or a name of a place where the system is installed may be displayed.

In the output example illustrated in FIG. 9, a recovery button is provided next to an apparatus (an apparatus C)

being displayed, in which the abnormality has been detected. When it is detected that the recovery button has been clicked, the control unit 425 instructs the communication instrument 220 to recover the program.

The control unit 425 may stop communication with the communication instrument 220 (in the internal system 22) that manages the apparatus in which the abnormality regarding authenticity has been detected by the verification unit 423, by rewriting certificate information. For example, the control unit 425 rewrites an attribute certificate for the communication instrument 220 in the internal system 22 in which an abnormality has been detected, using a mechanism of RFC5755. The control unit 425 may perform control to reconfigure the information communication system 10 except for the internal system 22 in which an abnormality has been detected and execute shrinking operation for the information communication system 12.

In the third example embodiment, the control unit 425 instructs the communication instrument 220 to recover the program for the apparatus 120 in which an abnormality has been detected, through the recovery API. Similar to the third example embodiment, providing the recovery API from the top verification device 420, even when the internal system 22 is at a remote location and it is difficult to immediately visit the location to take a recovery measure, makes it possible to take a measure for allowing the internal system 22 to function continuously.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, although a plurality of types of operation are described in order in the form of flowchart, the order of those described does not limit the order of executing the plurality of types of operation. Therefore, when each of the example embodiments is to be implemented, it is possible to change the order of the plurality of types of operation within a range where there will be no interference in content. In the third example embodiment, the control unit 425 in the top verification device 420 instructs the communication instrument 220 to recover the program for the apparatus 120 in which an abnormality has been detected, through the recovery API. When the communication instrument 220 has detected an abnormality in one of the apparatuses 120 managed by itself, however, the non-illustrated control unit in the communication instrument 220 may perform control in such a manner that the recovery program stored in the storage device 505 is decoded and the program is installed in the one of the apparatuses 120, in which the abnormality regarding authenticity has been detected. In this case, when the communication instrument 220 has detected an abnormality regarding authenticity for one of the apparatuses 120, it is possible to take measures for allowing the internal system 22 to automatically function continuously.

In the third example embodiment, even when an abnormality regarding authenticity for the communication instrument 220 or the upper verification device 320 has been detected, the control unit 425 may similarly control the recovery operation for the communication instrument 220 or the upper verification device 320 in which the abnormality has been detected. In this case, the control unit 425 may start an alternative apparatus prepared in advance in the information communication system 12, or may stop communication with the communication instrument 220 or the upper verification device 320 in which the abnormality has been detected. The control unit 425 may instruct recovery of the program for the communication instrument 220 or the upper verification device 320 in which the abnormality has been detected, through the API described above. The recovery program is stored in the storage device 505 in each of the communication instrument 220 and the upper verification device 320.

Although some or all of the example embodiments described above may be described as the following supplementary notes, the present invention is not limited to those described below.

Supplementary Note 1

An information communication system provided with a communication instrument and a verification device that verifies authenticity for the communication instrument, the information communication system including: a verification means for verifying authenticity for each of a plurality of apparatuses managed by the communication instrument; and a notification means for notifying, when an abnormality regarding the authenticity for one of the plurality of apparatuses is detected, a report on the abnormality in the one of the plurality of apparatuses to the verification device.

Supplementary Note 2

The information communication system described in Supplementary Note 1, further including one or a plurality of upper verification devices between the communication instrument and a top verification device, in which the one or the plurality of upper verification devices each include: a verification means for verifying the authenticity for the communication instrument or authenticity for one of the upper verification devices, the communication instrument or the one of the upper verification devices existing below the upper verification device; and a notification means for notifying, when an abnormality has been detected as a result of the verification on the authenticity, a report on the abnormality to one of the upper verification devices or the top verification device, the one of the upper verification devices or the top verification device existing above the upper verification device.

Supplementary Note 3

The information communication system described in Supplementary Note 1 or 2, in which the report on the abnormality includes information identifying the one of the apparatuses, the communication instrument, or the one of the upper verification devices, in which the abnormality has been detected.

Supplementary Note 4

The information communication system described in Supplementary Note 2, in which the top verification device includes:

a verification means for verifying the authenticity for the communication instrument or the upper verification devices existing below the top verification device; and an output means for outputting a result of the verification on one of the apparatuses, the communication instrument, and the upper verification devices forming the information communication system.

Supplementary Note 5

The information communication system described in Supplementary Note 4, in which the output means in the top verification device displays, in a drilling down manner, results of the verification on the apparatuses, the communication instrument, and the upper verification devices forming the information communication system.

Supplementary Note 6

The information communication system described in Supplementary Note 4 or 5, in which the top verification device further includes a control means for controlling operation of the communication instrument that manages one of the apparatuses, in which the abnormality regarding authenticity has been detected.

Supplementary Note 7

The information communication system described in Supplementary Note 6, in which the control means stops communication with the communication instrument by rewriting an attribute certificate for the communication instrument.

Supplementary Note 8

The information communication system described in Supplementary Note 6, further including a recovery application programming interface (API) for the one of the apparatuses, in which the abnormality has been detected, between the communication instrument and the top verification device, in which a storage means in the communication instrument stores with a recovery program that has been encrypted, and the control means instructs, through the API, the communication instrument to recover a program for the one of the apparatuses, in which the abnormality has been detected.

Supplementary Note 9

The information communication system described in any one of Supplementary Notes 6 to 8, in which, when an abnormality regarding authenticity for the communication instrument or one of the upper verification devices has been detected, the control means further controls recovery operation for the communication instrument or the one of the upper verification devices.

Supplementary Note 10

An information communication method including: verifying authenticity for each of a plurality of apparatuses managed by a communication instrument; and notifying, when an abnormality regarding authenticity has been detected in one of the plurality of apparatuses, a report on the abnormality in the one of the plurality of apparatuses to a verification device existing above the communication instrument.

Supplementary Note 11

A recording medium storing a program for causing a computer to execute: verifying authenticity for each of a plurality of apparatuses managed by a communication instrument; and notifying, when an abnormality regarding authenticity has been detected in one of the plurality of apparatuses, a report on the abnormality in the one of the plurality of apparatuses to a verification device existing above the communication instrument.

REFERENCE SIGNS LIST

10, 11, 12 information communication system
100, 110, 120 apparatus
101, 111, 121 program execution unit
102, 112, 122 security function unit
103, 113, 123 transmission unit
200, 210, 220 communication instrument
201, 211, 221 transmission-and-reception unit
202, 212, 222 authentication information storage unit
203, 213, 223 verification unit
204, 214, 224 notification unit
300, 310, 320 upper verification device
301, 311, 321 transmission-and-reception unit
312, 322 authentication information storage unit
313, 323 verification unit
314, 324 notification unit
400, 410, 420 top verification device
401, 411, 421 reception unit
402, 414, 424 output unit
412, 422 authentication information storage unit
413, 423 verification unit
425 control unit

What is claimed is:

1. An information communication system including a communication instrument, one or more upper verification devices and a top verification device, which have a layered structure, wherein the top verification device exists in a top layer, the one or more upper verification devices are managed by the top verification device or by another one of the upper verification devices existing in an upper layer, and the communication instrument is managed by one of the upper verification devices, the communication instrument including:

a memory storing instructions; and at least one processor configured to execute the instructions to:

verify authenticity for each of a plurality of apparatuses managed by the communication instrument, perform control, by the communication instrument, for causing a display device to display information indicating a report on an abnormality in one of the plurality of apparatuses when an abnormality regarding the authenticity for one of the plurality of apparatuses is detected, the abnormality regarding the authenticity being that hash values acquired after starting up are not identical to hash expected values, and store a recovery program that has been encrypted, the upper verification devices including, a memory storing instructions, and at least one processor configured to execute the instructions to, verify the authenticity for the communication instrument existing below the upper verification device or authenticity for one of the upper verification devices, and notify, when an abnormality has been detected as a result of the verification on the authenticity, a report on the abnormality to one of the upper verification devices existing above the upper verification device or the top verification device, and the top verification device including, a memory storing instructions, and at least one processor configured to execute the instructions to, verify the authenticity for the communication instrument or the upper verification devices existing below the top verification device, output a result of the verification on one of the apparatuses, the communication instrument, and the upper verification devices forming the information communication system, and instruct the communication instrument to install the recovery program in the one of the apparatuses, in which the abnormality has been detected.

2. The information communication system according to claim 1, wherein the report on the abnormality includes information identifying the one of the apparatuses, the communication instrument, or the one of the upper verification devices, in which the abnormality has been detected.

3. The information communication system according to claim 1, wherein the at least one processor of the top verification device is further configured to execute the instructions to:

display, in a drilling down manner, results of the verification on the apparatuses, the communication instrument, and the upper verification devices forming the information communication system.

4. The information communication system according to claim 1, wherein the at least one processor of the top verification device is further configured to execute the instructions to:

control operation of the communication instrument that manages one of the apparatuses, in which the abnormality regarding authenticity has been detected.

5. The information communication system according to claim 4, wherein the at least one processor of the top verification device is further configured to execute the instructions to:

stop communication with the communication instrument by rewriting an attribute certificate for the communication instrument.

6. The information communication system according to claim 4, further including a recovery application programming interface (API) for the one of the apparatuses, in which the abnormality has been detected, between the communication instrument and the top verification device, wherein the at least one processor of the communication instrument is further configured to execute the instructions to:

store a recovery program that has been encrypted, and the at least one processor of the top verification device is further configured to execute the instructions to:

instruct, through the API, the communication instrument to install the recovery program in the one of the apparatuses, in which the abnormality has been detected.

7. The information communication system according to claim 4, wherein, the at least one processor of the top verification device is further configured to execute the instructions to:

when an abnormality regarding authenticity for the communication instrument or one of the upper verification devices has been detected, control recovery operation for the communication instrument or the one of the upper verification devices.

8. An information communication method performed by an information communication system including a communication instrument, one or more upper verification devices and a top verification device, which have a layered structure, wherein the top verification device exists in a top layer, the one or more upper verification devices are managed by the top verification device or by another one of the upper verification devices existing in an upper layer, and the communication instrument is managed by one of the upper verification devices, the method comprising:

verifying, by the communication instrument, authenticity for each of a plurality of apparatuses managed by the communication instrument; and performing control, by the communication instrument, for causing a display device to display information indicating a report on an abnormality in one of the plurality of apparatuses when an abnormality regarding the authenticity for the one of the plurality of apparatuses is detected, the abnormality regarding the authenticity being that hash values acquired after starting up are not identical to hash expected values;

storing, by the communication instrument, a recovery program that has been encrypted;

verifying, by the upper verification devices, the authenticity for the communication instrument existing below the upper verification device or authenticity for one of the upper verification devices;

notifying, by the upper verification devices, when an abnormality has been detected as a result of the verification on the authenticity, a report on the abnormality to one of the upper verification devices existing above the upper verification device or the top verification device;

verifying, by the top verification device, the authenticity for the communication instrument or the upper verification devices existing below the top verification device;

outputting, by the top verification device, a result of the verification on one of the apparatuses, the communication instrument, and the upper verification devices forming the information communication system; and instructing, by the top verification device, the communication instrument to install the recovery program in the one of the apparatuses, in which the abnormality has been detected.

9. The information communication method according to claim 8, wherein the report on the abnormality includes information identifying the one of the apparatuses, the communication instrument, or the one of the upper verification devices, in which the abnormality has been detected.

10. The information communication method according to claim 8, further comprising:

displaying, by the top verification device, in a drilling down manner, results of the verification on the apparatuses, the communication instrument, and the upper verification devices forming the information communication system.

11. The information communication method according to claim 8, further comprising:

controlling, by the top verification device, operation of the communication instrument that manages one of the apparatuses, in which the abnormality regarding authenticity has been detected.

12. The information communication method according to claim 11, further comprising:

stopping, by the top verification device, communication with the communication instrument by rewriting an attribute certificate for the communication instrument.

13. The information communication method according to claim 11, further comprising:

providing a recovery application programming interface (API) for the one of the apparatuses, in which the abnormality has been detected, between the communication instrument and the top verification device, storing, by the communication instrument, a recovery program that has been encrypted, and instructing, by the top verification device through the API, the communication instrument to install the recovery program in the one of the apparatuses, in which the abnormality has been detected.

14. The information communication method according to claim 11, further comprising:

when an abnormality regarding authenticity for the communication instrument or one of the upper verification devices has been detected, controlling, by the top verification device, recovery operation for the communication instrument or the one of the upper verification devices.

15. A non-transitory recording medium storing a program for causing a computer to execute processing in an information communication system including a communication instrument, one or more upper verification devices and a top verification device, which have a layered structure, wherein the top verification device exists in a top layer, the one or more upper verification devices are managed by the top verification device or by another one of the upper verification devices existing in an upper layer, and the communication instrument is managed by one of the upper verification devices, the processing comprising:

verifying, by the communication instrument, authenticity for each of a plurality of apparatuses managed by the communication instrument; and performing control, by the communication instrument, for causing a display device to display information indicating a report on an abnormality in one of the plurality of apparatuses when an abnormality regarding the authenticity for the one of the plurality of apparatuses is detected, the abnormality regarding the authenticity being that hash values acquired after starting up are not identical to hash expected values;

storing, by the communication instrument, a recovery program that has been encrypted;

verifying, by the upper verification devices, the authenticity for the communication instrument existing below the upper verification device or authenticity for one of the upper verification devices;

notifying, by the upper verification devices, when an abnormality has been detected as a result of the verification on the authenticity, a report on the abnormality to one of the upper verification devices existing above the upper verification device or the top verification device;

verifying, by the top verification device, the authenticity for the communication instrument or the upper verification devices existing below the top verification device;

outputting, by the top verification device, a result of the verification on one of the apparatuses, the communication instrument, and the upper verification devices forming the information communication system; and instructing, by the top verification device, the communication instrument to install the recovery program in the one of the apparatuses, in which the abnormality has been detected.

16. The non-transitory recording medium according to claim 15, wherein the program further causes the computer to execute:

stopping, by the top verification device, communication with the communication instrument by rewriting an attribute certificate for the communication instrument.

17. The non-transitory recording medium according to claim 15, wherein the program further causes the computer to execute:

providing a recovery application programming interface (API) for the one of the apparatuses, in which the abnormality has been detected, between the communication instrument and the top verification device, storing, by the communication instrument, a recovery program that has been encrypted, and instructing, by the top verification device through the API, the communication instrument to install the recovery program in the one of the apparatuses, in which the abnormality has been detected.

18. The non-transitory recording medium according to claim 15, wherein the program further causes the computer to execute:

when an abnormality regarding authenticity for the communication instrument or one of the upper verification devices has been detected, controlling, by the top verification device, recovery operation for the communication instrument or the one of the upper verification devices.

* * * * *